(12) United States Patent
Li et al.

(10) Patent No.: US 11,101,921 B2
(45) Date of Patent: Aug. 24, 2021

(54) METHOD AND APPARATUS FOR PERFORMING UPLINK/DOWNLINK TRANSMISSION IN A FLEXIBLE SUBFRAME

(71) Applicant: Samsung Electronics Co., Ltd., Gyeonggi-do (KR)

(72) Inventors: Yingyang Li, Beijing (CN); Chengjun Sun, Beijing (CN)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 15/232,291

(22) Filed: Aug. 9, 2016

(65) Prior Publication Data
US 2016/0352455 A1 Dec. 1, 2016

Related U.S. Application Data

(62) Division of application No. 14/158,073, filed on Jan. 17, 2014, now abandoned.

(30) Foreign Application Priority Data

Jan. 18, 2013 (CN) .......................... 201310020656.5
Mar. 6, 2013 (CN) .......................... 201310070609.1

(Continued)

(51) Int. Cl.
*H04L 1/00* (2006.01)
*H04L 5/00* (2006.01)
(Continued)

(52) U.S. Cl.
CPC ............. *H04L 1/0026* (2013.01); *H04B 1/50* (2013.01); *H04L 1/1671* (2013.01);
(Continued)

(58) Field of Classification Search
CPC .... H04L 5/0048; H04W 24/10; H04W 72/042
(Continued)

(56) References Cited

U.S. PATENT DOCUMENTS 9,510,339 B2* 11/2016 Seo ......................... H04B 17/00
9,787,383 B2* 10/2017 Seo ....................... H04B 7/0626
(Continued)

FOREIGN PATENT DOCUMENTS

EP          2 897 407         7/2015
KR       1020120133982       12/2012
(Continued)

OTHER PUBLICATIONS

European Search Report dated Jul. 15, 2016 issued in counterpart application No. 14740865.2-1874, 10 pages.
(Continued)

*Primary Examiner* — Parth Patel
*Assistant Examiner* — Berhanu D Belete
(74) *Attorney, Agent, or Firm* — The Farrell Law Firm, P.C.

(57) ABSTRACT

A method and apparatus are provided for reporting channel state information (CSI) by a user equipment (UE). The method includes identifying two interference measurement resources, if the UE is configured with two CSI subframe sets by a base station (BS); obtaining CSI based on an interference measurement resource within a subframe set; and reporting the obtained CSI associated with the subframe set to the BS.

4 Claims, 4 Drawing Sheets

(30) Foreign Application Priority Data

Apr. 3, 2013 (CN) .................. 201310116424.X
Aug. 21, 2013 (CN) .................. 201310367667.0

(51) Int. Cl.

| | |
|---|---|
| H04B 1/50 | (2006.01) |
| H04L 1/16 | (2006.01) |
| H04W 24/10 | (2009.01) |
| H04W 72/04 | (2009.01) |
| H04W 72/08 | (2009.01) |

(52) U.S. Cl.

CPC .......... *H04L 5/0048* (2013.01); *H04W 24/10* (2013.01); *H04W 72/0446* (2013.01); *H04W 72/082* (2013.01); *H04W 72/042* (2013.01)

(58) Field of Classification Search

USPC ................. 370/252, 310, 351, 431, 463
See application file for complete search history.

(56) References Cited

U.S. PATENT DOCUMENTS

| | | | |
|---|---|---|---|
| 2009/0247223 A1* | 10/2009 | Yu ................. | H04W 72/042 455/557 |
| 2010/0083285 A1* | 4/2010 | Bahat ................ | G06F 16/907 719/328 |
| 2011/0176461 A1* | 7/2011 | Astely ............... | H04B 7/2656 370/280 |
| 2011/0249584 A1* | 10/2011 | Barbieri ............ | H04L 5/0091 370/252 |
| 2012/0201154 A1* | 8/2012 | Chandrasekhar .... | H04W 24/10 370/252 |
| 2012/0208547 A1* | 8/2012 | Geirhofer .......... | H04L 5/0032 455/452.2 |
| 2012/0263057 A1* | 10/2012 | Choi ................ | H04B 7/2656 370/252 |
| 2012/0327800 A1* | 12/2012 | Kim ................. | H04B 17/318 370/252 |
| 2013/0156008 A1* | 6/2013 | Dinan .............. | H04W 36/0072 370/332 |
| 2013/0188516 A1* | 7/2013 | He .................. | H04W 72/0446 370/254 |
| 2013/0196675 A1* | 8/2013 | Xiao ................ | H04W 72/082 455/452.1 |
| 2013/0208604 A1* | 8/2013 | Lee .................. | H04L 25/0226 370/252 |
| 2013/0223332 A1* | 8/2013 | Wu .................. | H04L 5/0048 370/315 |
| 2013/0272170 A1* | 10/2013 | Chatterjee .......... | H04W 28/08 370/280 |
| 2013/0279361 A1* | 10/2013 | Seo ................. | H04W 24/10 370/252 |
| 2013/0301432 A1* | 11/2013 | Hammarwall ...... | H04B 7/0639 370/252 |
| 2013/0301434 A1* | 11/2013 | Krishnamurthy .... | H04L 1/0026 370/252 |
| 2013/0301450 A1* | 11/2013 | Geirhofer ......... | H04B 7/024 370/252 |
| 2013/0301465 A1* | 11/2013 | Seo ................. | H04B 7/0626 370/252 |
| 2013/0315114 A1* | 11/2013 | Seo ................. | H04L 5/001 370/280 |
| 2013/0343299 A1* | 12/2013 | Sayana ............. | H04B 7/024 370/329 |
| 2014/0016497 A1* | 1/2014 | Seo ................. | H04L 5/0023 370/252 |
| 2014/0018118 A1* | 1/2014 | Hammarwall ...... | H04B 17/345 455/501 |
| 2014/0071848 A1* | 3/2014 | Park ................ | H04L 5/0057 370/252 |
| 2014/0098721 A1* | 4/2014 | Chen ................ | H04W 72/0446 370/280 |
| 2014/0112248 A1* | 4/2014 | Bergman ........... | H04B 17/24 370/328 |
| 2014/0126496 A1* | 5/2014 | Sayana ............. | H04B 7/024 370/329 |
| 2014/0161003 A1* | 6/2014 | Han ................. | H04L 5/1469 370/280 |
| 2014/0185539 A1* | 7/2014 | Seo ................. | H04B 7/2656 370/329 |
| 2014/0269456 A1* | 9/2014 | Wang ............... | H04W 72/082 370/280 |
| 2014/0321313 A1* | 10/2014 | Seo ................. | H04J 11/0056 370/252 |
| 2014/0321407 A1* | 10/2014 | Seo ................. | H04B 7/0626 370/329 |
| 2015/0029964 A1* | 1/2015 | Seo ................. | H04L 5/001 370/329 |
| 2015/0043469 A1* | 2/2015 | Kim ................ | H04L 5/005 370/329 |
| 2015/0049689 A1* | 2/2015 | Seo ................. | H04L 5/0073 370/329 |
| 2015/0078272 A1* | 3/2015 | Kim ................ | H04L 5/0005 370/329 |
| 2015/0156751 A1* | 6/2015 | Seo ................. | H04B 17/00 370/329 |
| 2015/0236808 A1* | 8/2015 | Liu ................. | H04L 1/0019 370/252 |
| 2015/0358142 A1* | 12/2015 | Lee ................. | H04W 24/08 370/252 |
| 2015/0358962 A1* | 12/2015 | Lee ................. | H04L 27/26 370/336 |
| 2016/0285652 A1* | 9/2016 | Seo ................. | H04L 5/0048 |

FOREIGN PATENT DOCUMENTS

| | | | | |
|---|---|---|---|---|
| KR | 1020130006818 | 1/2013 | | |
| WO | WO 2012/096532 | 7/2012 | | |
| WO | WO 2012096532 A2 * | 7/2012 | .......... | H04B 7/0626 |
| WO | WO 2012/138149 | 10/2012 | | |
| WO | WO-2012138149 A2 * | 10/2012 | ........ | H04W 72/1278 |
| WO | WO 2012/149673 | 11/2012 | | |
| WO | WO 2012/161508 | 11/2012 | | |
| WO | WO 2012157870 A2 * | 11/2012 | .......... | H04L 5/0023 |
| WO | WO 2012/171465 | 12/2012 | | |
| WO | WO 2013/025558 | 2/2013 | | |
| WO | WO-2012157870 A9 * | 3/2013 | ........ | H04W 72/1268 |
| WO | WO 2014/072814 | 5/2014 | | |

OTHER PUBLICATIONS

Samsung, "Discussion on PDSCH Rate Matching and Configuration of IMR and ZP-CSI-RS", R1-124914, 3GPP TSG RAN WG1 #71, Nov. 12-16, 2012.

Sharp, "DCI Signalling in DCI Format 2D and Fallback Operation in TM10", R1-125242, 3GPP TSG RAN WG1 Meeting #71, Nov. 12-16, 2012.

3GPP TSG RAN WG1 Meeting #70bis, R1-124316, Signaling for quasi co-location assumptions and PDSCH rate matching, Oct. 8-12, 2012.

3GPP TSG RAN WG1 Meeting #70bis, R1-124333, PDSCH RE mapping and quasi-collocation signaling for CoMP, Oct. 8-12, 2012.

Huawei, HiSilicon, "Interference Measurement Resource Configuration", R1-123103, 3GPP TSG RAN WG1 Meeting #70, Aug. 13-17, 2012, 6 pages.

DL CoMP Rapporteur (Samsung), R1-124669, 3GPP TSG RAN WG1 #70bis, Oct. 8-12, 2012, 5 pages.

Japanese Office Action dated Apr. 9, 2018 issued in counterpart application No. 2015-553656, 8 pages.

Sharp et al., "WF on PUCCH Format 1a/1b Resource Allocation for ePDCCH based HARQ-ACKs", R1-123013, TSG-RAN WG1 Meeting #69, May 21-25, 2012, 4 pages.

Korean Office Action dated Mar. 24, 2020 issued in counterpart application No. 10-2015-7022322, 8 pages.

CATT, "On QCL Behaviour in TM10", R1-124757, 3GPP TSG RAN WG1 Meeting #71, Nov. 12-16, 2012, 2 pages.

(56) References Cited

OTHER PUBLICATIONS

Korean Office Action dated Sep. 4, 2020 issued in counterpart application No. 10-2020-7018335, 9 pages.
NTT Docomo, "Interference Measurement Mechanism for Rel-11", R1-121935, 3GPP TSG RAN WG1 Meeting #69, May 21-25, 2012, 10 pages.
Korean Office Action dated Apr. 12, 2021 issued in counterpart application No. 10-2020-7018335, 10 pages.

* cited by examiner

METHOD AND APPARATUS FOR PERFORMING UPLINK/DOWNLINK TRANSMISSION IN A FLEXIBLE SUBFRAME

PRIORITY

This application is a Divisional Application of U.S. application Ser. No. 14/158,073, which was filed in the U.S. Patent and Trademark Office on Jan. 17, 2014, and claims priority under 35 U.S.C. § 119(a) to Chinese Patent Application Nos. 201310020656.5, 201310070609.1, 201310116424.X, and 201310367667.0 which were filed in the State Intellectual Property Office of the People's Republic of China on Jan. 18, 2013, Mar. 6, 2013, Apr. 3, 2013, and Aug. 21, 2013, respectively, the entire content of each of which is incorporated herein by reference.

BACKGROUND OF THE INVENTION

1. Field of the Invention

The present invention relates generally to wireless communication systems, and more particularly, to a method and apparatus for performing UpLink/DownLink (UL/DL) transmission in a flexible subframe.

2. Description of the Related Art

Figure 1:
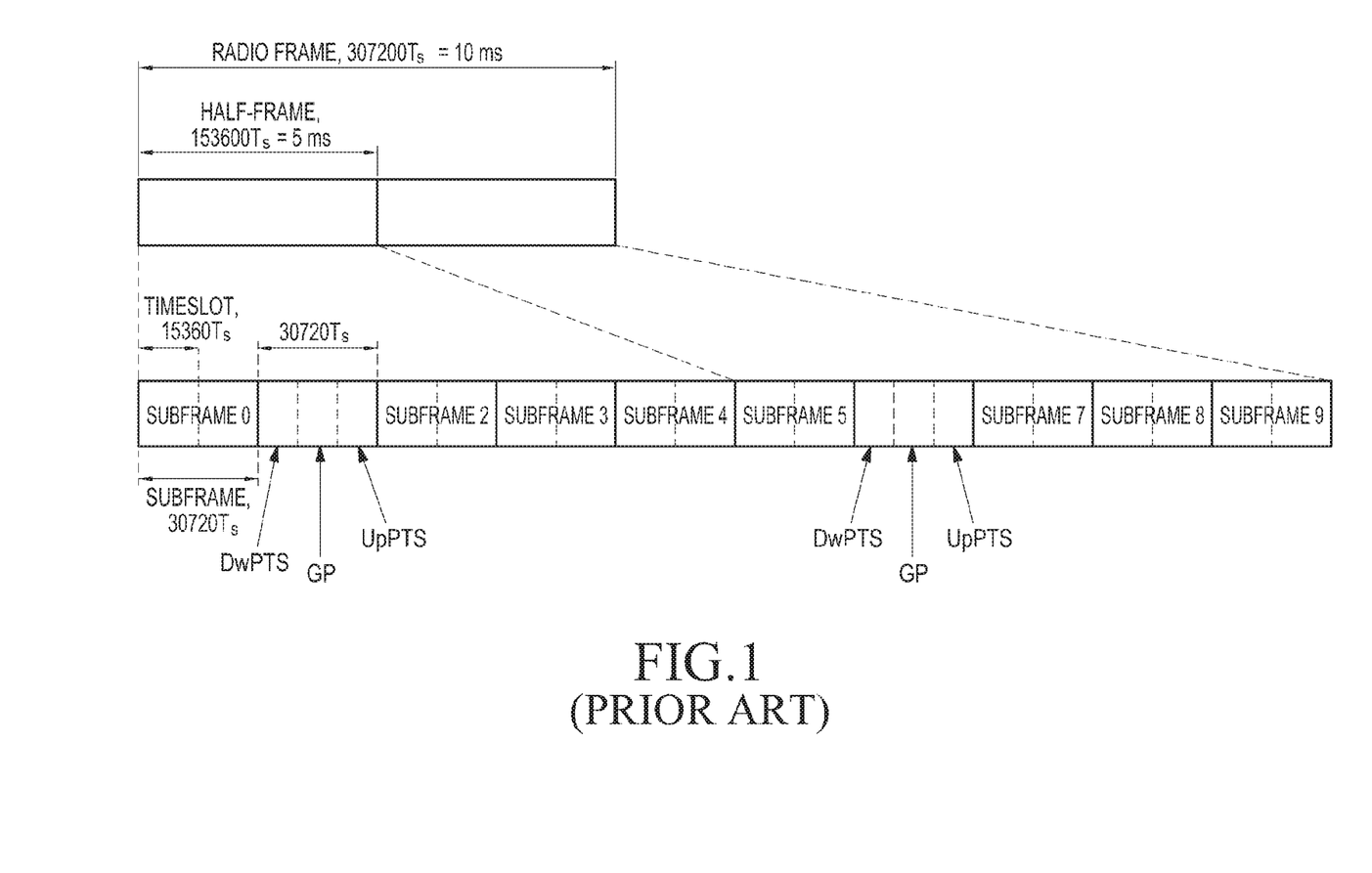
FIG. 1 is a schematic diagram illustrating a frame structure in a TDD system.

A Long Term Evolution (LTE) communication system supports a Time Division Duplexing (TDD) working mode. FIG. 1 is a schematic diagram illustrating a frame structure of a TDD system. Each radio frame has a length of 10 ms and is equally divided into two half frames each having a length of 5 ms. Each half frame includes eight time slots that each have a length of 0.5 ms. Each half frame further includes three special fields (i.e., Downlink Pilot Time Slot (DwPTS), Guarding Period (GP), and Uplink Pilot Time Slot (UpPTS)). The combined length of the three special fields is 1 ms. Each subframe includes two consecutive time slots (e.g., the k'th subframe includes time slot 2k and time slot 2k+1). A TDD system supports seven types of UL/DL configurations, as shown in Table 1. In Table 1, D represents a downlink subframe, U represents an uplink subframe, and S represents a special subframe including the 3 special fields.

TABLE 1

LTE TDD UL/DL configuration

| Configuration serial number | Switch-point periodicity | \multicolumn{10}{c}{Sub-frame ID} |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

According to LTE TDD specifications, subframe 0, subframe 5, DwPTS in subframe 1, and DwPTS in subframe 6 are always used for downlink transmission, while subframe 2, subframe 1, and UpPTS in subframe 6 are always used for uplink transmission. The other 5 subframes (i.e., subframes 3, 4, 7, 8 and 9) are used as downlink subframes in some UL/DL configurations and are used as uplink subframes in other UL/DL configurations.

In conventional LTE TDD standards, the UL/DL configuration adopted by a cell is configured via broadcast signaling (i.e., the UL/DL configuration is included in system information block 1 (SIB1)). As such, the LTE system supports at least 640 ms between changes of UL/DL configurations and a maximum of 32 changes of system information every 3 hours, according to conventional standards. In order to be better adapted to fast changes in service characteristics, the 3$^{rd}$ Generation Partnership Project (3GPP) is currently working on schemes enabling faster changes in distribution of UL/DL subframes in the system. For example, the 3GPP may change UL/DL configuration more frequently, such as one UL/DL configuration change every 200 ms in a semi-static changing scheme; or changing UL/DL configuration every 10 ms, which is the length of a radio frame. In practice, a base station scheduler may change the distribution of UL/DL subframes according to service demands, and keep the system running properly by adopting a certain scheduling limiting scheme. A UE does is not required to know which of the seven UL/DL configurations the UE is running under. Further, the distribution of working UL/DL subframes is not necessarily limited to the seven UL/DL configurations as shown in Table 1 (i.e., the distribution of UL/DL subframes actually adopted by the system may be transparent to UEs).

In a system supporting flexible changes in distribution of UL/DL subframes adopted by a cell, a base station may adjust the distribution of UL/DL subframes based on current distribution of UL/DL traffic to optimize system performances. However, problems exist in such a system. More specifically, some cells may use a subframe whose duplexing direction is flexible (referred to as a flexible subframe) for uplink transmission, and other cells may use the flexible subframe for downlink transmission, which brings changes in interference. In a cell using the subframe for uplink transmission, an uplink signal of a UE may suffer interference caused by a downlink signal from an adjacent base station. In a cell using the subframe for downlink transmission, a downlink signal transmitted to a UE in the cell may suffer interference caused by an uplink signal from a UE in an adjacent cell. In conventional LTE TDD systems, there is no such base station-to-base station interference and UE-to-UE interference caused by subframes on the same timing position. Such changes in interference may affect transmission of downlink control signaling and downlink data in the flexible subframes.

SUMMARY OF THE INVENTION

The present invention has been made to address at least the problems and disadvantages described above and to provide at least the advantages described below.

Accordingly, an aspect of the present invention is to provide a method and an apparatus for performing UpLink/DownLink (UL/DL) transmission in a flexible subframe to improve performances of UL/DL transmission in a flexible subframe.

According to an aspect of the present invention, a method is provided for reporting channel state information (CSI) by a user equipment (UE). The method includes identifying two interference measurement resources, if the UE is configured with two CSI subframe sets by a base station (BS); obtaining CSI based on an interference measurement resource within a subframe set; and reporting the obtained CSI associated with the subframe set to the BS.

According to another aspect of the present invention, a user equipment (UE) is provided for reporting channel state information (CSI). The UE includes a transceiver; and a controller configured to identify two interference measurement resources, if the UE is configured with two CSI subframe sets by a base station (BS); obtain CSI based on an interference measurement resource within a subframe set; and report the obtained CSI associated with the subframe set to the BS.

According to another aspect of the present invention, a method is provided for receiving, by a base station (BS), channel state information (CSI). The method includes configuring, for a user equipment (UE), two CSI subframe sets including two interference measurement resources; and receiving, from the UE, CSI associated with the subframe set, wherein the CSI is obtained based on an interference measurement resource within a subframe set by the UE.

According to another aspect of the present invention, a base station (BS) is provided for receiving a report of channel state information (CSI). The BS includes a transceiver; and a controller configured to configure, for a user equipment (UE), two CSI subframe sets including two interference measurement resources; and receive, from the UE, CSI associated with the subframe set, wherein the CSI is obtained based on an interference measurement resource within a subframe set by the UE.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION OF EMBODIMENTS OF THE INVENTION

Hereinafter, various embodiments of the present invention are described with reference to the accompanying drawings. In the following description of the present, a detailed description of known functions and configurations incorporated herein may be omitted when such a description may obscure the subject matter of the present invention.

In a TDD system that supports a flexible configuration of the distribution of UL/DL subframes according to an embodiment of the present invention, a UL/DL configuration is still sent in broadcast channel SIB1 in order to provide backward compatibility, and all UEs in a cell can receive the UL/DL configuration, which is referred to herein as "SIB1 backward UL/DL configuration". UEs may be classified into two categories based on whether the UEs supports flexible configuration of distribution of UL/DL subframes. One of the two categories includes UEs that do not support flexible configuration of distribution of UL/DL subframes. UEs of category one may only work according to SIB1 backward UL/DL configuration. When a base station changes the transmission directions of certain subframes, a base station scheduler performs certain actions to avoid scheduling UL/DL transmission of UEs of category one in those subframes whose duplexing directions are changed so as to guarantee normal UL/DL data transmission of the UEs of category one. The other of the two categories includes UEs that support flexible configuration of distribution of UL/DL subframes.

A method according an embodiment of the present invention is applied to this category of UEs that support flexible configuration of distribution of UL/DL subframes. System performances can be optimized by defining actions of UEs of category two. According to a method for determining a flexible subframe according to an embodiment of the present invention, if a UE transmits PDSCH based on DL reference UL/DL configurations, a subframe that is an uplink subframe in SIB1 UL/DL configuration and is a downlink subframe in the DL reference UL/DL configuration is determined to be a flexible subframe.

In a flexible subframe, some cells perform uplink transmission while other cells perform downlink transmission, which results in mutual interference between uplink and downlink transmissions. In a cell performing uplink transmission in the subframe, an uplink signal of a UE in the cell may suffer interference caused by a downlink signal from an adjacent base station. In a cell performing downlink transmission in the subframe, a downlink signal transmitted to a UE in the cell may also suffer interference caused by an uplink signal from a UE in an adjacent cell. However, in conventional LTE TDD systems, there is no such interference between base stations and between UEs, since all base stations in conventional LTE TDD systems have the same duplexing direction in a timing position of a subframe. The changes in the distribution of interference may affect UL/DL data transmission in a flexible subframe (e.g., transmission of Enhanced Physical Downlink Control channel (EPDCCH), transmission of physical downlink shared channel (PDSCH), and transmission of physical uplink shared channel (PUSCH)).

Figure 2:
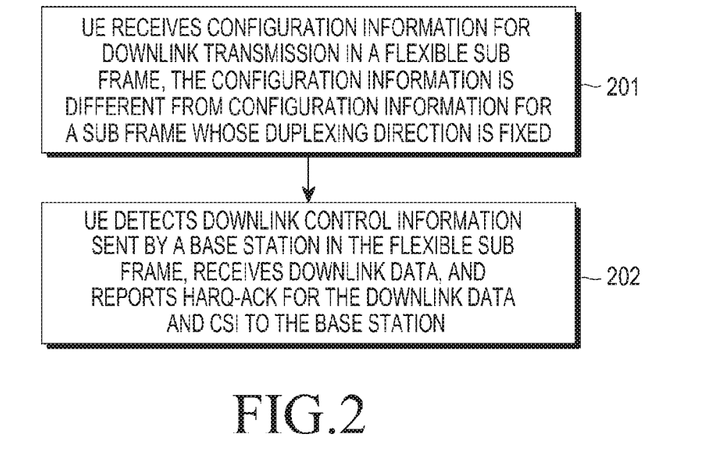
FIG. 2 is a flowchart illustrating a method for performing UL/DL transmission in a flexible subframe according to an embodiment of the present invention.

FIG. 2 is a flowchart illustrating a method for UL/DL transmission in a flexible subframe according to an embodiment of the present invention.

Referring to FIG. 2, in block 201, a UE receives configuration information of downlink transmission in a flexible subframe. The configuration information is different from configuration information of subframes with fixed duplexing directions.

A first method for performing uplink/downlink transmission in a flexible subframe according to an embodiment of the present invention includes adopting, when the flexible subframe is used for downlink transmission, a subframe structure of a Multicast Broadcast Single Frequency Network (MBSFN), a Cell-Specific Reference Signal (CRS) and downlink control information are transmitted in the forepart of the flexible subframe, and transmitting a PDSCH in a data field of the flexible subframe.

The first method for performing uplink/downlink transmission in a flexible subframe further includes adopting, when the flexible subframe is used for uplink transmission, the subframe structure of the MBSFN, transmitting CRS and downlink control information in the forepart of the flexible subframe, and transmitting a PUSCH in the data field of the flexible subframe.

When N is the total number of OFDM symbols and the subframe structure of the MBSFN is adopted and a number "m" of OFDM symbols is used for downlink transmission which are located at the forepart of the subframe, the number of uplink Single Carrier Frequency Division Multiple Address (SCFDMA) symbols that can be used as bearer is less than N-m, because both a UE and a base station need time for performing UL/DL switching.

Five examples, according to the above-described method, of a method for determining resources available for uplink transmission in a flexible subframe according to an embodiment of the present invention are described as follows.

Herein, a subframe adopting a subframe the MBSFN structure is referred to as an "MBSFN subframe", and a subframe that does not adopt the subframe the MBSFN structure is referred to as a "non-MBSFN subframe".

A first example of the first method for determining resources for uplink transmission based on MBSFN according to an embodiment of the present invention includes determining that the number of OFDM symbols available for downlink transmission, which is represented by "n", by using a Physical Control Format Indicator CHannel (PCFICH) of a MBSFN subframe. The first n OFDM symbols in the subframe are regarded as dedicated for downlink transmission, and remaining time of the subframe may be used for uplink transmission.

A second example of the first method for determining resources for uplink transmission based on MBSFN according to an embodiment of the present invention includes generating OFDM symbols at the forepart of the MBSFN subframe including a CRS dedicated for downlink transmission, and making remaining part of the subframe available for uplink transmission. When there are one or two CRS ports, only the first OFDM symbol of the subframe is dedicated for downlink transmission. Alternatively, when there are four CRS ports, the first two OFDM symbols are dedicated for downlink transmission.

A third example of the first method for determining resources for uplink transmission based on MBSFN according to an embodiment of the present invention includes generating OFDM symbols located at the forepart of the MBSFN subframe including a CRS dedicated for downlink transmission, generating OFDM symbols that may be occupied by Physical HARQ Indicator Channel (PHICH) transmission dedicated for downlink transmission (i.e., the number of symbols dedicated for downlink transmission is $\max(N_{CRS}, N_{PHICH})$), and making the remaining time of the subframe available for uplink transmission. $N_{CRS}$ denotes the number of OFDM symbols located at the forepart of a MBSFN subframe including CRS, and $N_{PHICH}$ denotes the time length of PHICH configured in P-BCH (i.e., the number of OFDM symbols occupied by PHICH transmission).

The fourth example of the first method for determining resources for uplink transmission based on MBSFN according to an embodiment of the present invention includes for a flexible MBSFN subframe in which PHICH may be transmitted, determining the number of OFDM symbols dedicated for downlink transmission according to the third example described above, and determining that a remaining time of the subframe is available for uplink transmission; determining, for a flexible MBSFN subframe which does not transmit PHICH, the number of OFDM symbols dedicated for downlink transmission according to the second example described above, and determining that a remaining time of the subframe is available for uplink transmission, since fewer than all subframes are able to transmit uplink scheduling information (i.e., a UL grant) and PHICH according to a timing scheme of HARQ for PUSCH in LTE systems.

The fifth example of the first method for determining resources for uplink transmission based on MBSFN according to an embodiment of the present invention includes configuring the number of OFDM symbols dedicated for downlink transmission in a flexible MBSFN subframe via higher layer signaling, or configuring the index of an OFDM symbol which is the start position of symbols for uplink transmission via higher layer signaling. Further, the higher layer may configure multiple different types of PUSCH transmission configuration information for flexible subframes. Each type of PUSCH transmission configuration indicates a different number of OFDM symbols dedicated for downlink transmission, and the remaining time of the subframe may be used for uplink transmission.

The last four examples (i.e., the second through fifth examples) of the first method for performing UL/DL transmission in a flexible subframe may be implemented in a base station by setting a value of PCFICH of an MBSFN to be the number of OFDM symbols actually used for downlink transmission.

The above-described first method for performing UL/DL transmission in a flexible subframe adopts a subframe structure of MBSFN, which guarantees CRS transmission free from influence of changes in duplexing direction of the subframe. Therefore, when such flexible subframes are used for uplink transmission, Radio Resource Management (RRM) measurements of lower version UEs that do not support flexible subframes will not be influenced.

A second method for performing UL/DL transmission in a flexible subframe according to an embodiment of the present invention includes when a flexible subframe is used for downlink transmission, transmitting no CRSs within the flexible subframe, determining that all OFDM symbols in the subframe are available for downlink transmission, and transmitting downlink control signaling only through frequency division multiplexing with PDSCH (e.g., using EPDCCH defined in LTE Release 11), when transmitting downlink control signaling; and determining, when the flexible subframe is used for uplink transmission, that all of the OFDM symbols are available for uplink transmission.

In the above-described first and second methods for performing UL/DL transmission in a flexible subframe, when a flexible subframe is used for downlink transmission, methods based on DeModulation Reference Signal (DMRS) de-multiplexing may be adopted for PDSCH, because a CRS exists only in the forepart of the subframe, or alternatively, there is no CRS in the subframe.

A third method for performing UL/DL transmission in a flexible subframe according to an embodiment of the present invention is described as follows. When a flexible subframe is used for downlink transmission, a CRS having a regular CRS structure of a subframe is transmitted throughout the whole subframe, and Resource Elements (REs) other than the CRS are available for downlink transmission. By using this structure, all downlink transmission modes that are defined in LTE systems and that need CRS transmission are available to be applied to the flexible subframe. When a flexible subframe is used for uplink transmission, all OFDM symbols are available to be used for uplink transmission.

According to LTE Release 11 specifications, for Transmission Mode (TM) 10, the system is able to configure four different types of configuration information for RE mapping and Quasi Co-Location (QCL) of PDSCH and indicates the type of RE mapping and QCL adopted by the current PDSCH transmission via two bits in a Downlink Control Indication (DCI) format. Parameters involved in the process may include the number of CRS ports, the index of OFDM symbol which is the start position of symbols used for PDSCH mapping, MBSFN subframe configuration, configuration a of Non-Zero Power Channel State Indication Reference Signal (NZP CSI-RS) and configuration of a Zero Power Channel State Indication Reference Signal (ZP CSI-RS), and so on.

The CRS structure adopted by a flexible subframe may be configured by using a dedicated signaling mechanism. Alternatively, when a UE is configured with any of TM1 through TM9, the UE may determine a CRS is included in a flexible subframe. When a UE is configured with TM10, the UE determines whether a flexible subframe includes a CRS and the structure of the subframe having a CRS based on PDSCH RE mapping and QCL configuration.

When a UE is configured with any of TM1 through TM9, a conventional MBSFN configuration may be used for specifying whether a flexible subframe used for downlink transmission adopts a structure of a regular subframe having CRS or a structure of an MBSFN subframe having CRS. For example, if uplink subframes in SIB1 UL/DL configuration are flexible subframes, when a bit corresponding to the uplink subframe is set in MBSFN configuration, the flexible subframe adopts the structure of an MBSFN subframe having CRS when the flexible subframe is used for downlink transmission. Meanwhile, when the bit corresponding to the uplink subframe is cleared in the MBSFN configuration, the flexible subframe adopts the structure of a regular subframe having CRS when the flexible subframe is used for downlink transmission.

With respect to TM10, when a flexible subframe is used to transmit a PDSCH, RE mapping and QCL configuration may be different from the configuration of a subframe dedicated for downlink transmission. Taking RE mapping as an example, the CRS structure in the flexible subframe may be different from the CRS structure in the subframe dedicated for downlink transmission, and correspondingly, the RE mapping method for PDSCH may also be different. For example, all REs in a flexible subframe may be available for PDSCH transmission when there is no CRS within the subframe. In addition, QCL configuration of a flexible subframe may also be different from that of a subframe dedicated for downlink transmission.

In LTE Release 11, when RE mapping and QCL configuration of a PDSCH is configured, a configuration for a ZP CSI-RS may be configured. A UE may disregard REs occupied by ZP CSI-RS during rate matching, and skip the REs configured to be occupied by ZP CSI-RS during RE mapping. The ZP CSI-RS may be used for improve measurement accuracy of CSI-RS of other cells, and may also include Interference Measurement Resources (IMR). The ZP CSI-RS can include one or multiple IMR resources, which are subjected to eNB configuration. In LTE Release 11, when the ZP CSI-RS includes IMR, the inclusion of IMR indicates that the influence of IMR has been counteracted during rate matching and RE mapping. When the ZP CSI-RS does not include IMR, no particular processing is performed on IMR during rate matching and RE mapping i.e., rate matching is performed assuming that IMR may transmit PDSCH, but PDSCH may not be transmitted in IMR during RE mapping, which leads to deterioration of PDSCH link performances. In LTE Release 11, configuration of ZP CSI-RS is implemented through configuration of a cyclic period "T" and a subframe offset "k", i.e., ZP CSI-RS is configured once for every T subframes and occupies the k'th subframe in each cyclic period. The cyclic period T of ZP CSI-RS is an integral multiple of 5 ms.

FIGS. 5 to 8 are flowcharts illustrating various examples of operations performed in a method for performing UL/DL transmission in a flexible subframe according to an embodiment of the present invention. More specifically, steps 201A, 201B, 201C, and 201D in FIGS. 5-8, respectively, are examples of operations performed according to step 201 described with respect to FIG. 2. Meanwhile, step 202 in each of FIGS. 5-8 correspond to step 202 of FIG. 2.

Figure 5:
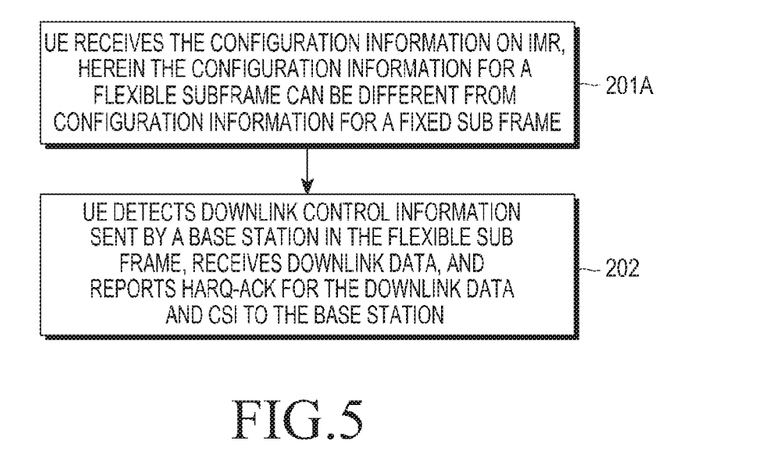
FIGS. 5 to 8 are flowcharts illustrating various examples of operations performed in a method for performing UL/DL transmission in a flexible subframe according to an embodiment of the present invention.

As shown in FIG. 5, a step 201A is an example of an operation performed according to step 201 in FIG. 2. Referring to FIG. 5, at step 201A, a UE receives the configuration information on IMR, wherein the configuration information for a flexible subframe can be different from configuration information for a fixed subframe. Since the distribution of interferences in a flexible subframe is different from the distribution in a subframe dedicated for downlink transmission, interference measurement signals may be configured respectively in the subframe dedicated for downlink transmission and in the flexible subframe to measure interferences in the subframe dedicated for downlink transmission and in the flexible subframe respectively. For example, the IMR structure defined in LTE Release 11 may be used. According to an embodiment of the present invention, two IMR may be configured for two different subframe sets, respectively. For a ZP CSI-RS that serves as the i'th IMR, where i=0, 1, a cyclic period $T_i$, a subframe offset $k_i$, and RE resources of CSI-RS occupied by the IMR in a subframe may be configured.

One of the two IMR may have some or all of the above parameters, i.e., the cyclic period $T_i$, the subframe offset $k_i$ and the RE resources of CSI-RS occupied by the IMR in a subframe, different from corresponding parameters of the other one of the two IMR. For example, the two IMR may have the same cyclic period and occupy the same RE resources of CSI-RS in a subframe, but have different subframe offsets. Different subframe offsets guarantee that the two IMR are located in two different subframe sets, so that interferences in the two subframe sets may be measured respectively.

One subframe set may include all the subframes dedicated for downlink transmission, and the other subframe set may include all the flexible subframes. Alternatively, the subframe sets may be classified based on interference levels instead of based on flexible subframes and subframes dedicated for downlink transmission. For example, one subframe set may include all subframes dedicated for downlink transmission and flexible subframes whose interferences are mainly caused by downlink transmission in other cells, and the other subframe set may include the other flexible subframes by excluding the flexible subframes in the first subframe set.

Furthermore, different flexible subframes may generally have different distributions of interferences. For example, if subframes 3, 4, 8, and 9 are flexible subframes, subframes 3 and 8 have higher probabilities of being used for uplink transmission than subframes 4 and 9, therefore the interference distribution may be different. Based on the above analysis, subframes may be divided into N (where N is greater than 2) subframe sets to have the flexible subframes classified into multiple subframe sets, where each subframe set only includes flexible subframes having similar interference levels and/or subframes dedicated for downlink transmission. In this example, N IMR (where N is greater than 2) may be configured for use by the N different subframe sets respectively. This configuration can be regarded as an extension of the above-described IMR allocation method.

According to the LTE TDD frame structure, subframes 0 and 1 in a half frame are generally dedicated for downlink transmission, and subframes 3 and 4 in the half frame may be flexible subframes. In order to measure interference in a downlink subframe dedicated for downlink transmission and in a flexible subframe respectively, the above ZP CSI-RS configured based on multiples of 5 ms cannot cover all IMR, and thus leads to deterioration in link performances of PDSCH transmission.

Figure 6:
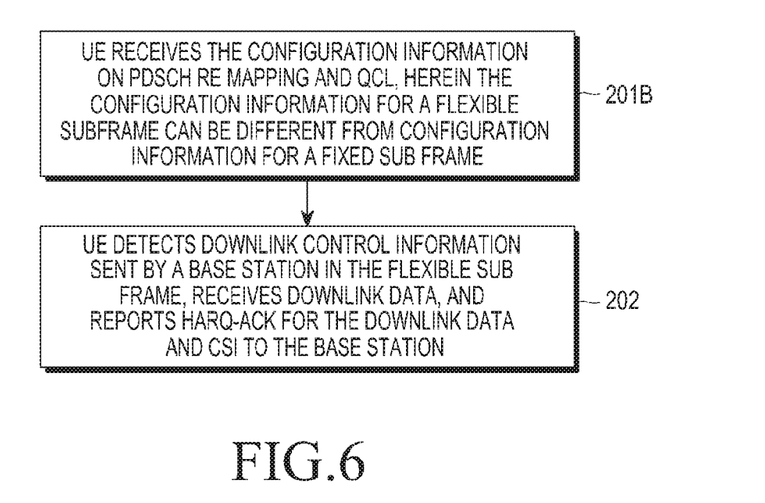

As shown in FIG. 6, a step 201B is an example of an operation performed according to step 201 in FIG. 2. Referring to FIG. 6, at step 201A, a UE receives the configuration information on PDSCH RE mapping and QCL, wherein the configuration information for a flexible subframe can be different from configuration information for a fixed subframe. Different ZP CSI-RSs may be configured for subframes dedicated for downlink transmission and flexible subframes during configuration of RE mapping and QCL of PDSCH. For example, subframes dedicated for downlink transmission and flexible subframes may have respective cyclic periods of ZP CSI-RS and subframe offsets configured individually. The ZP CSI-RS configured for flexible subframes may include resources used as IMR to guarantee the link performances of PDSCH transmission. Alternatively, the RE mapping and QCL configuration information may also include extra information indicating IMR. The extra information could reuse the same configuration scheme for IMR as defined in the LTE Release 11 system.

Unlike the manner defined in Release 11, the extra information indicating IMR may be added into RE mapping and QCL. In this case, the extra information will indicate that "a UE may delete the REs occupied by IMR during rate matching and skip those REs occupied by IMR during RE mapping". The information may indicate the IMR only for flexible subframes, or may indicate both the IMR for flexible subframes and the IMR for subframes dedicated for downlink transmission.

Several methods for configuring RE mapping and QCL configuration information of PDSCH of flexible subframes according to embodiments of the present invention are described as follows.

A first method for configuring RE mapping and QCL configuration information of PDSCH of flexible subframes according to an embodiment of the present invention includes configuring four types of RE mapping and QCL configuration information of a PDSCH, which are applied to all subframes. The four types of configuration information may be directly applied to subframes dedicated for downlink transmission, and may be applied to flexible subframes with respective schemes for configuring RE mapping and QCL of PDSCH adjusted.

According to current standards, MBSFN indication information is provided during configuration of RE mapping and QCL of PDSCH. For a subframe dedicated for downlink transmission, RE mapping of PDSCH is performed based on a CRS structure of a regular subframe when the subframe is indicated as a non-MBSFN subframe, and is performed based on the CRS structure of an MBSFN subframe when the subframe is indicated as an MBSFN subframe.

For a flexible subframe, RE mapping may be performed based on the structure of an MBSFN subframe including a CRS of a subframe without a CRS according to higher layer signaling. For example, a new information field may be added into RE and QCL configuration information of PDSCH to specify whether the RE mapping is performed based on the structure of an MBSFN subframe having a CRS or the structure of a subframe without a CRS; alternatively, conventional MBSFN indication information may be adopted to specify whether the structure of an MBSFN subframe having a CRS or the structure of a subframe without a CRS is to be adopted for RE mapping. Taking the MBSFN indication information as an example, RE mapping of a PDSCH is performed for a flexible subframe indicated as an MBSFN subframe by using the structure of an MBSFN subframe having a CRS for transmission. RE mapping of PDSCH is performed for a flexible subframe indicated as a non-MBSFN subframe by using a structure of a subframe without CRS, i.e., assuming that the whole subframe does not include CRS RE, i.e., assuming the number of CRS ports is 0. According to this first method for configuring RE mapping and QCL configuration information of PDSCH of flexible subframes, an RE mapping scheme may be defined for each of the four types of PDSCH RE mapping and QCL configuration information by using the MBSFN indication information. For example, for one type of RE mapping and QCL configuration information, the MBSFN indication information may specify a subframe adopts the structure of an MBSFN subframe having CRS for RE mapping and for another type of RE mapping and QCL configuration information, the MBSFN indication information may specify RE mapping of the same subframe is performed, by assuming there is no CRS.

Supposing a flexible subframe is only allowed to adopt the structure of a regular subframe that has a CRS or the structure of a subframe without a CRS for downlink transmission, the RE mapping and QCL configuration may only have to specify which of the two structures is to be adopted. For a flexible subframe, RE mapping is performed based on the structure of a regular subframe that has a CRS or the structure of a subframe without a CRS, as indicated in higher layer signaling. For example, a new information field may be added in PDSCH RE and QCL configuration information, in order to specify whether the RE mapping is performed based on the structure of a regular subframe having CRS or the structure of a subframe without CRS.

Alternatively, conventional MBSFN indication information may be adopted to specify the structure adopted by RE mapping is of a regular subframe or of a subframe without CRS. Taking the MBSFN indication information as an example, an RE available for PDSCH transmission in a flexible subframe indicated as an MBSFN subframe may be determined by using the structure of a subframe without a CRS (i.e., the RE mapping is performed by assuming that the whole subframe does not include a CRS RE, by assuming the number of CRS ports is 0); RE mapping for PDSCH transmission may performed in a flexible subframe indicated as a non-MBSFN subframe according to the structure of a regular subframe. According to this method, the MBSFN indication information may be used for defining the RE mapping scheme for each of the four types of RE mapping and QCL configuration information of PDSCH. For example, for one type of RE mapping and QCL configuration information, the MBSFN indication information may specify that RE mapping of a subframe is performed by using the structure of a regular subframe having a CRS; and for another type of RE mapping and QCL configuration information, the MBSFN indication information may specify that RE mapping of the same subframe is performed under the assumption that there is no CRS. In an example, the above structure of a subframe without a CRS may be replaced with the structure of an MBSFN subframe that has a CRS, and therefore downlink transmission in a flexible subframe may be configured to adopt one of the structure of a regular subframe that has a CRS and the structure of an MBSFN structure that has a CRS.

If it is not possible to include a CRS within a flexible subframe, the four types of RE mapping and QCL configuration information of PDSCH all indicate RE mapping is performed under the assumption that the entire subframe does not include any CRS REs, and therefore only have to indicate other information that may affect RE mapping and QCL information.

Alternatively, the RE mapping scheme may be determined based on the duplexing direction indicated in SIB1 for the flexible subframe. More specifically, if SIB1 indicates the flexible subframe is a downlink subframe, RE mapping is performed according to the CRS structure of an MBSFN subframe; if SIB1 indicates the flexible subframe is an uplink subframe, RE mapping is performed according to a method when there is no CRS.

Alternatively, MBSFN indication information and the duplexing direction indicated in SIB1 for a flexible subframe may be used in combination for determining the RE mapping scheme. For example, when SIB1 indicates a flexible subframe is a downlink subframe, RE mapping is carried out based on the CRS structure of an MBSFN subframe, if the flexible subframe is an MBSFN subframe. Meanwhile, if the flexible subframe is a non-MBSFN subframe, RE mapping is carried out based on the CRS structure of a regular subframe. When SIB1 indicates a flexible subframe is uplink, RE mapping is carried out by assuming there is no CRS.

In order to indicate the IMR in a flexible subframe, a subframe dedicated for downlink transmission and a flexible subframe may have different ZP CSI-RSs configured in RE mapping and QCL configuration of PDSCH. The ZP CSI-RS of a flexible subframe has different cyclic period and subframe offset from the ZP CSI-RS of a subframe dedicated for downlink transmission. Therefore, influence of IMR can be eliminated during rate matching and RE mapping for a flexible subframe so as to improve link performances of PDSCH transmission.

Alternatively, the RE mapping and QCL configuration information may also include extra information indicating IMR. The extra information could reuse the same configuration scheme for IMR as defined in the LTE Release 11 system. Unlike the manner defined in Release 11, the extra information indicating IMR is added into RE mapping and QCL. The extra information will indicate "a UE may delete the REs occupied by IMR during rate matching and skip those REs occupied by IMR during RE mapping". The information may indicate only the IMR for flexible subframes, or may indicate the IMR for flexible subframes and the IMR for subframes dedicated for downlink transmission respectively.

A second method for configuring RE mapping and QCL configuration information of PDSCH of flexible subframes according to an embodiment of the present invention includes higher layer signaling (e.g., RRC) may be adopted for configuring RE mapping and QCL configuration information dedicated for a flexible subframe. For example, RE mapping scheme of PDSCH may be optimized based on whether the flexible subframe includes CRS, and a more reasonable QCL information may be configured for the flexible subframe.

According to LTE R11 specifications, RE mapping and QCL configuration information of PDSCH includes information on the number of CRS (Cell-specific Reference Signal) ports. The number of CRS ports corresponding to a flexible subframe in the configuration information may be 0, 1, 2, or 4 ports, because the flexible subframe may adopt the structure of a subframe without CRS. The number of CRS ports is set to be 0 when no CRSs are to be transmitted in the flexible subframe (i.e., the flexible subframe adopts a subframe structure without CRS).

According to LTE R11 specifications, RE mapping and QCL configuration information of PDSCH includes information on the index of an OFDM symbol at the starting position for PDSCH mapping. A flexible subframe may be not allowed to transmit PDCCH because the flexible subframe may adopt a subframe structure without CRS, and therefore, all OFDM symbols in the subframe may be available for PDSCH transmission. Alternatively, when a flexible subframe includes a CRS, all of the OFDM symbols may also be available for PDSCH transmission. As such, the index of the OFDM symbol at the starting position may be one of 0, 1, 2, 3, and 4. The index of the starting OFDM symbol may be set to be 4 only when the system bandwidth is smaller than 10 Physical Resource Blocks (PRB). When a flexible subframe includes a CRS, for an RE in which symbols to which the PDSCH is mapped to are in conflict with a PCFICH or with a PHICH according to the index of the starting OFDM symbol in the configuration, two methods may be adopted to solve the conflict. One method generates REs other than those occupied by the PCFICH and the PHICH be used for PDSCH transmission; the other method receives a PDSCH from all OFDM symbols starting from the index of the starting OFDM symbol (i.e., the UE assumes the PDSCH is also transmitted also in REs occupied by the PCFICH and the PHICH).

If the flexible subframe adopts a structure of a regular subframe, a structure of an MBSFN subframe having a CRS or a structure of a subframe without a CRS for performing downlink transmission, one of the three above-described CRS structures is indicated during configuration of RE mapping and QCL information for a flexible subframe to perform RE mapping.

If a flexible subframe adopts only the MBSFN structure or the structure without a CRS for downlink transmission, the configuration information of RE mapping and QCL only has to identify which of the two structures is to be adopted. According to current standards, MBSFN indication information is provided during configuration of RE mapping and QCL of PDSCH. For a flexible subframe, RE mapping is performed based on the CRS structure of an MBSFN subframe or of a regular subframe according to higher layer signaling. For example, a new information field may be added in RE and QCL configuration information of PDSCH to specify whether the RE mapping is performed based on the CRS structure of an MBSFN subframe or the structure of a subframe without CRS.

Alternatively, conventional MBSFN indication information may be adopted to specify the structure adopted by RE mapping is the structure of an MBSFN subframe or the structure of a subframe without CRS. When the MBSFN indication information is adopted, a flexible subframe indicated as an MBSFN subframe may adopt the MBSFN structure and identify the RE for PDSCH transmission by using the number of CRS ports and frequency offset; a flexible subframe indicated as a non-MBSFN subframe may perform RE mapping of PDSCH by assuming there is no CRS.

The MBSFN indication information may be used for defining the RE mapping scheme for each of the four types of RE mapping and QCL configuration information of PDSCH. For example, one type of RE mapping and QCL configuration information may use the MBSFN indication information to indicate RE mapping of a subframe is performed based on the CRS structure of an MBSFN subframe; and another type of RE mapping and QCL configuration information may use the MBSFN indication information to indicate RE mapping of the same subframe is performed assuming there is no CRS.

If the flexible subframe is only allowed to adopt the structure of a regular subframe having a CRS or the structure of a subframe without CRS for downlink transmission, the RE mapping and QCL configuration information may only have to specify which of the above two structures is to be adopted. For a flexible subframe, RE mapping is performed based on the structure of a regular subframe having CRS or the structure of a subframe without CRS as indicated in higher layer signaling. For example, a new information field may be added in PDSCH RE and QCL configuration information to specify whether the RE mapping is performed based on the structure of a regular subframe having CRS or the structure of a subframe without CRS.

Alternatively, conventional MBSFN indication information may be adopted to specify the structure adopted by RE mapping is of a regular subframe having CRS or of a subframe without a CRS. Taking the MBSFN indication information as an example, an RE available for PDSCH transmission in a flexible subframe indicated as an MBSFN subframe may be determined by using the structure of a subframe without a CRS When RE mapping is performed under the assumption that the whole subframe does not include a CRS RE, it is assumed that the number of CRS ports is 0. RE mapping for PDSCH transmission may performed in a flexible subframe indicated as a non-MBSFN subframe according to the structure of a regular subframe having CRS. According to this method, the MBSFN indication information may be used for defining the RE mapping scheme for each of the four types of RE mapping and QCL configuration information of PDSCH. For example, for one type of RE mapping and QCL configuration information, the MBSFN indication information may specify RE mapping of a subframe is performed by using the structure of a regular subframe having CRS; and for another type of RE mapping and QCL configuration information, the MBSFN indication information may specify RE mapping of the same subframe is performed by assuming there is no CRS. In an example, the above structure of a subframe without a CRS may be replaced with the structure of an MBSFN subframe having CRS, and therefore downlink transmission in a flexible subframe may be configured to adopt one of the structure of a regular subframe that has a CRS and the structure of an MBSFN structure that has a CRS.

If it is not possible to include a CRS in the flexible subframe, the configuration information of RE mapping and QCL only needs to indicate other information that may affect RE mapping and QCL information. Other parameters related with RE mapping and QCL may also differ for the two types of subframes (i.e., the flexible subframes and subframes having fixed duplexing directions). For example, configuration information of RE mapping and QCL having the same index may correspond to different NZP CSI-RS resources.

In order to indicate IMR in a flexible subframe, ZP CSI-RS configuration dedicated to a flexible subframe may be set in the configuration information of RE mapping and QCL of PDSCH. The ZP CSI-RS of a flexible subframe has a different cyclic period and subframe offset than the ZP CSI-RS of a subframe dedicated for downlink transmission. Therefore, influence of IMR can be eliminated during rate matching and RE mapping for a flexible subframe, so as to improve link performances of PDSCH transmission. Alternatively, the RE mapping and QCL configuration information may also include extra information indicating IMR. The extra information could reuse the same configuration scheme for IMR as defined in the LTE Release 11 system. Unlike the manner defined in Release 11, the extra information indicating IMR is added into RE mapping and QCL. The extra information will indicate "a UE may delete the REs occupied by IMR during rate matching and skip those REs occupied by IMR during RE mapping". The information may indicate the IMR only for flexible subframes, or may indicate the IMR for flexible subframes and the IMR for subframes dedicated for downlink transmission respectively.

A third method for configuring RE mapping and QCL configuration information of PDSCH of flexible subframes according to an embodiment of the present invention is described as follows. In the third method for configuring RE mapping and QCL configuration information of PDSCH of flexible subframes, a flexible subframe always adopts the same configuration information of RE mapping and QCL. The configuration information of RE mapping and QCL may be dedicatedly configured for the flexible subframe via RRC signaling, or may be one of the four types of configuration information of RE mapping and QCL for subframes dedicated for downlink transmission.

Figure 7:
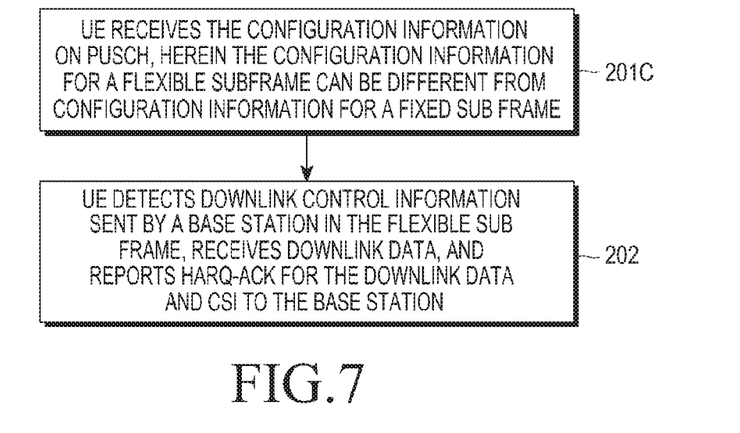

As shown in FIG. 7, a step 201C is an example of an operation performed according to step 201 in FIG. 2. Referring to FIG. 7, at step 201A, a UE receives the configuration information on PUSCH, wherein the configuration information for a flexible subframe can be different from configuration information for a fixed subframe. Similar to the method that defines four types of configurations of RE mapping and QCL for PDSCH transmission of a UE, multiple types of PUSCH transmission configurations may be configured for PUSCH transmission of a UE, and the type of PUSCH transmission configuration to be adopted may be dynamically indicated in a DCI format that is for scheduling uplink transmission.

For example, one possible variable parameter is the start position of OFDM symbols for PUSCH transmission. Two RE mapping schemes of a PUSCH may be defined by using the parameter One of these two RE mapping schemes indicates that a time period except the first OFDM symbol may be used for uplink transmission The other of two the RE mapping schemes may indicates that all symbols in the subframe may be used for uplink transmission.

Another possible parameter indicates whether a cell-specific SRS symbol is configured in the uplink subframe, i.e., whether the last SCFDMA symbol in the subframe is reserved and thus is not available for PUSCH transmission.

Since PUSCH transmission of a UE may be received from different Transmission Points (TPs) and the propagation delays from the UE to different TPs are generally different, a Time Advance (TA) of PUSCH transmission may also be configured. Downlink reference timing for PUSCH transmission of a UE may also be configured. For example, the configuration may indicate which NZP CSI-RS the UE may use to measure downlink signals to determine the uplink transmission time of the UE. According to the method, the TP from which the UE may receive PUSCH can be dynamically selected, thus link performances can be optimized.

Similar to the PDSCH processing method, multiple types of configurations for PUSCH transmission may be configured and applied to all subframes. Alternatively, the flexible subframe and the subframe dedicated for uplink transmission may have respective configurations of PUSCH transmission configured via individual signaling.

Figure 8:
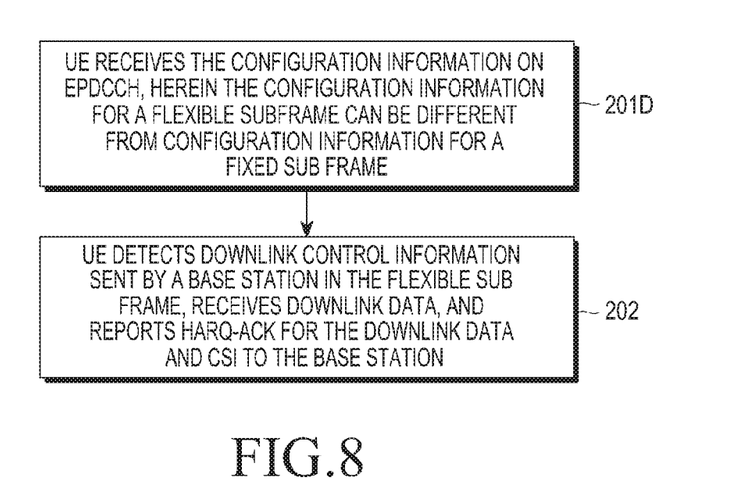

As shown in FIG. 8, a step 201D is an example of an operation performed according to step 201 in FIG. 2. Referring to FIG. 8, at step 201A, a UE receives the configuration information on EPDCCH, wherein the configuration information for a flexible subframe can be different from configuration information for a fixed subframe. When a flexible subframe is used as a downlink subframe, an EPDCCH transmitted in the flexible subframe may adopt a configuration method different from configuration methods of other subframes dedicated for downlink transmission.

According to an embodiment of the present invention, the two types of subframes, i.e., the flexible subframes and the subframes having fixed duplexing direction, have different interference distributions, needs to take influences of uplink transmission of other cells into consideration during EPDCCH transmission, and therefore, may have different PRBs that are suitable for respective EPDCCH transmission. Parameters of an EPDCCH set dedicated for EPDCCH transmission in a flexible subframe may be configured via RRC signaling. One or more of the following parameters of an EPDCCH set may be different from that of a subframe dedicated for downlink transmission:

1. The number of EPDCCH sets for UE blind detection may be configured, i.e., the number of EPDCCH sets detected by the same UE in the above two types of subframes may be different.
2. The type of EPDCCH set may be configured, which may be a distributed EPDCCH set or a localized EPDCCH set, and the type of EPDCCH sets or the number of each type of EPDCCH sets detected by a UE in the above two types of subframes may be different.
3. The number and the index of PRB pairs occupied by an EPDCCH set may be configured. In LTE Release 11, the number of PRB pairs included in an EPDCCH set may be 2, 4 or 8, and the number and the index of PRB pairs detected by a UE in the above two types of subframes may be different.
4. The number of candidate EPDCCH of each converging level in an EPDCCH set may be configured, i.e., the number of candidate EPDCCH at each converging level of one EPDCCH set corresponding to the two types of subframes of the UE may be different. For example, in order to improve the reliability of EPDCCH transmission, the smallest converging level available for EPDCCH in a flexible subframe may be two Enhanced Control Channel Elements (ECCEs); or the smallest converging level of EPDCCH may be configured according to the interference level of the flexible subframe. For example, if the interference is strong, the smallest converging level may be configured as two ECCEs via higher layer signaling.
5. The start position of the OFDM symbols for EPDCCH transmission in an EPDCCH set may be configured, i.e., the start position of OFDM symbols for EPDCCH transmission in the above two types of subframes of a UE may be different. Different start positions of OFDM symbols for EPDCCH transmission may be configured for flexible subframes of MBSFN type and for flexible subframes in which CRS has been removed. RE mapping of EPDCCH of a flexible subframe in which a CRS has been removed may be performed from the start position of OFDM symbols in the subframe.
6. The RE mapping method for an EPDCCH may be configured, i.e., the method of performing RE mapping for the same EPDCCH in the above two types of subframes of a UE may be different. Configurations of a ZP CSI-RS that must be considered during RE mapping may also be different for the two types of subframes.

In order to improve anti-interference performances of a flexible subframe, the subframe may be defined such that only a regression mode can be adopted for UL/DL data transmission in a flexible subframe. For example, a subframe may be defined such that only Space-Frequency Block Coding (SFBC)-based transmission diversity technique can be used for downlink data transmission, so that a UE only needs to use Detect Control Information format 1A (DCI 1A) in a UE-specific searching space of the UE, Alternatively, a UE may use only DCI format 0 for scheduling single transmitting antenna based uplink data transmission in a flexible subframe.

According to LTE Release 11 standards, in transmission mode 10, configuration of RE mapping and QCL for each EPDCCH set of a UE is kept consistent with one of the 4 configurations of RE mapping and QCL of PDSCH of the UE. Therefore, different EPDCCH sets may be in QCL relation with different NZP CSI-RS. There may be different ZP CSI-RS configurations, and the number of CRS ports and MBSFN subframe configuration may also be different.

If the above-described first method of configuring RE mapping and QCL of a PDSCH, i.e., four types of configurations of RE mapping and a QCL are defined and applied to all of subframes, each EPDCCH set is kept consistent with one of the above four types of configurations. If the above-described second method of configuring RE mapping and QCL of a PDSCH is adopted, i.e., dedicated configurations of RE mapping and a QCL of a PDSCH is defined for flexible subframes, each EPDCCH in a flexible subframe may be consistent with one of the dedicated configurations of RE mapping and a QCL of a PDSCH.

A relation that associates the index of an EPDCCH set of a flexible subframe with corresponding index of RE mapping and QCL information of a PDSCH may be consistent with that of subframes dedicated for downlink transmission. Therefore, no extra signaling is needed. Alternatively, extra RRC signaling may be transmitted to configure the relation that associates an EPDCCH set with RE mapping and QCL information of a PDSCH for flexible subframes. EPDCCH sets having the same index may have different QCL relations in the two types of subframes, i.e., CSI-RS resources of DMRS that satisfy QCL relations and correspond to the same EPDCCH set may be different for the two types of subframes of a UE.

In addition, if a base station does not configure new dedicated parameters of an EPDCCH set for a flexible subframe, this absence of a new configuration may be interpreted as a default situation, in which the flexible subframe adopts the same parameters of an EPDCCH set with that adopted by a subframe dedicated for downlink transmission. Particularly, in transmission mode 10, if new RE mapping and QCL relation of an EPDCCH set are not configured for a flexible subframe, this absence of a new configuration may be regarded as a default situation, in which the flexible subframe adopts the same RE mapping and QCL relation with those adopted by other subframes dedicated for downlink transmission.

Referring back to FIG. 2, in block 202, a UE detects downlink control information transmitted by a base station in a flexible subframe, receives downlink data corresponding to the downlink control information, and reports HARQ-ACK of the downlink data and downlink channel state indication information (CSI) to the base station.

Flexible subframes and subframes dedicated for downlink transmission have different interference distributions and different channel states, therefore interference signals are measured in flexible subframes and in subframes dedicated for downlink transmission respectively to obtain accurate CSI feedback information.

LTE Release 11 and communications according to earlier versions of the LTE standards already allow feeding back a CSI for different subframe sets. For example, subframes dedicated for downlink transmission may be defined as a subframe set in which interference is measured, and flexible subframes may be defined as a subframe set in which interference is measured. Because a CRS is generally not transmitted in a flexible subframe or in the data field of a flexible subframe, interference may be measured in specific time-frequency resources.

In LTE Release 11, IMR for interference measurement, which is an RE occupying a CSI-RS with 4 ports is defined. According to LTE Release 11, the current cell does not transmit downlink signals on IMR, and other cells may transmit a PDSCH on the IMR, therefore signals received from these REs directly reflect the distribution of interferences.

According to an embodiment of the present invention, two IMR may be configured for two different respective subframe sets. For ZP CSI-RS, which serves as the i'th IMR, where i=0, 1, a cyclic period $T_i$, a subframe offset $k_i$ and RE resources of CSI-RS port occupied by the ZP CSI-RS in a subframe may be configured.

The two IMRs may have some or all of the above parameters, i.e., the cyclic period $T_i$, the subframe offset $k_i$ and the RE resources of CSI-RS occupied by the IMR in a subframe, different from those of each other. For example, the two IMR resources may have the same cyclic period and occupy the same RE resources of CSI-RS in a subframe, but have different subframe offsets. Different subframe offsets guarantee that the two IMRs are located in two different subframe sets so that interferences in the two subframe sets may be measured respectively.

One subframe set may include all the subframes dedicated for downlink transmission, and the other subframe set may include all the flexible subframes. Alternatively, the subframe sets may be classified based on interference levels instead of based on flexible subframes and subframes dedicated for downlink transmission. For example, one subframe set may include all subframes dedicated for downlink transmission and flexible subframes whose interferences are mainly caused by downlink transmission in other cells, and the other subframe set may include the other flexible subframes by excluding the flexible subframes in the first subframe set.

Furthermore, different flexible subframes may generally have different distributions of interferences. For example, if subframes 3, 4, 8 and 9 are flexible subframes, subframes 3 and 8 have higher probabilities of being used for uplink transmission than subframes 4 and 9. Therefore, the interference distribution may be different.

Based on the above analysis, subframes may be divided into N subframe sets (where N is greater than 2) to have the flexible subframes classified into multiple subframe sets where each subframe set only includes flexible subframes having similar interference levels and/or subframes dedicated for downlink transmission. In this example, N IMRs (where N is greater than 2) may be configured for use by the N different subframe sets respectively. This configuration can be regarded as an extension of the above-described IMR allocation method.

A flexible subframe may be used for downlink transmission or for uplink transmission. When a flexible subframe is currently used by some UEs for uplink transmission, needs of other UEs in the cell for downlink interference measurements should also be satisfied.

According to an embodiment of the present invention, when other UEs in the current cell still need to measure interferences on a flexible subframe, which, at the time, is used for uplink transmission in the cell, there should be a guarantee that uplink signals will not be transmitted in time-frequency resources used for downlink interference measurement. Other cells may transmit PUSCH or PDSCH in downlink IMR of the current cell irrespective of whether the other cells are performing uplink transmission or downlink transmission. A UE is able to obtain accurate measurements of interferences in a flexible subframe only when both of the above two conditions are met.

To perform downlink interference measurement of a UE even when a flexible subframe is scheduled for uplink transmission in the current cell, timing of uplink transmission and downlink transmission in the current cell may be kept synchronized with each other at the level of OFDM symbols so that downlink signals will not be transmitted in REs used for downlink interference measurement in the current cell. Since UEs and base stations in a cell may have different propagation delays, it is impossible to keep uplink/downlink signals accurately synchronized at the level of OFDM symbol. But propagation delay plays an unimportant role for a small cell, therefore relatively accurate measurements of interferences can be obtained, as long as quasi-synchronization at the level of OFDM symbol can be maintained without requiring alignment of subframe boundaries.

According to LTE standards, uplink signals of a UE actually occupy half of a sub carrier, and result in ill-alignment of uplink/downlink sub carriers when the flexible subframe is used for UL/DL transmission, i.e., there is an offset of half a sub carrier. UL/DL sub carriers should be aligned to obtain accurate interference measurements. A method for performing such an alignment according to an embodiment of the present invention may include transmitting uplink signals in a flexible subframe according to the classification of sub carriers and PRBs of downlink subframes of LTE, which may not conform to single carrier characteristics.

Another method may include transmitting downlink signals in a flexible subframe according to classification of sub carriers and PRBs of uplink subframes of LTE.

If it is not necessary for uplink transmission in a flexible subframe to keep the single carrier characteristics, the IMR of LTE Release 11 may be adopted. Bit drilling may be performed for uplink transmission signals according to the timing offset of UL/DL transmission of a flexible subframe, i.e., the timing offset of OFDM symbols when the flexible subframe is used for UL/DL transmission Therefore, the downlink signal will not be transmitted on IMR of the flexible subframe in the current cell.

Figure 3:
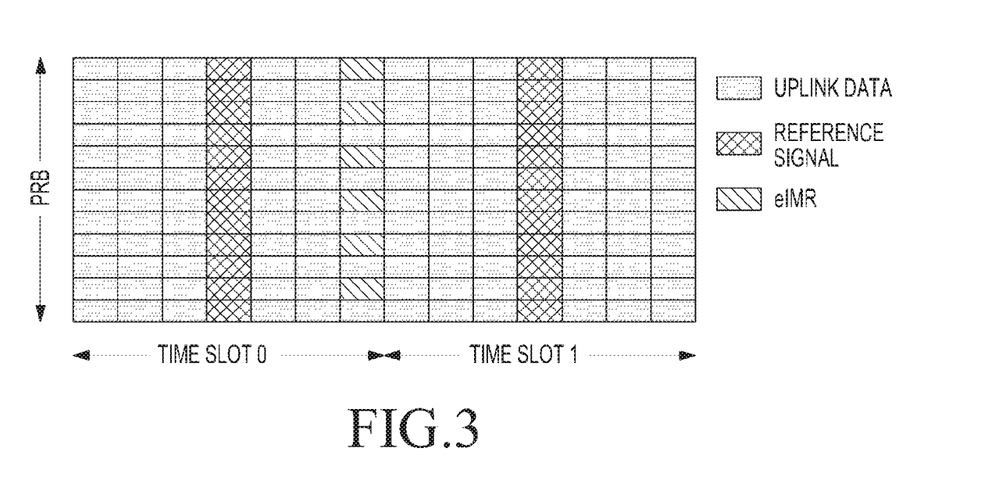
FIG. 3 is a schematic diagram illustrating an interference measuring signal according to an embodiment of the present invention.

If it is necessary for uplink transmission in a flexible subframe to keep the single carrier characteristics, a new time-frequency structure of IMR is defined. This new structure of IMR is referred to as "enhanced IMR (eIMR)" herein. Current IMR occupy one sub carrier in every six sub carriers in an OFDM symbol. Transmitting uplink signal by a UE in remaining REs will violate the single carrier characteristics. To meet the above two requirements for downlink interference measurement, a UE may need to transmit no uplink signal on the eIMR, and transmit uplink signal on other sub carriers within the same OFDM symbol while keeping the single carrier characteristics of the uplink signal. FIG. 3 is a schematic diagram illustrating an eIMR in accordance with an embodiment of the present invention. The eIMR is defined such that it is included in an OFDM symbol by using a method where a RePetition Factor (RPF) is 2 (i.e., the eIMR occupies one out of every two sub carriers). A UE does not use REs occupied by an eIMR for uplink transmission, and may transmit uplink data on the other half of sub carrier resources not occupied by eIMRs.

The UE may disregard the REs occupied by eIMRs when performing rate matching and PUSCH RE mapping, i.e., performing rate matching by using the number of PUSCH REs excluding the REs occupied by eIMR. Alternatively, the UE may adopt a conventional rate matching method to remove only the Quadrature Amplitude Modulation (QAM) symbols of REs corresponding to eIMRs.

NZP CSI-RS are not transmitted in a subframe, or the subframe is used for downlink transmission, because the duplexing direction of a flexible subframe may change according to eIMR timing. Therefore, OFDM symbols occupied by eIMR are not restricted by CSI-RS. But eIMR should avoid OFDM symbols of uplink reference signal, in order to avoid affecting the transmission of uplink reference signals.

The above two methods are based on the assumption that a flexible subframe that is configured to include eIMR may be scheduled for uplink transmission, which means a UE that is scheduled to perform uplink transmission at the time is not able to measure interferences, which may adversely affect the interference measurement of CSI.

In view of the above, another method for configuring IMR according to an embodiment of the present invention includes generating a first flexible subframe of an Evolved Node B (eNB) used for downlink transmission on timing of IMR when the IMR is configured in the first flexible subframe; making a duplexing direction of a second flexible subframe having an index of radio frame the same with an index of the first flexible subframe flexible if the second flexible subframe does not include IMR.

According to an embodiment of the present invention, an adjacent cell may have an IMR configured in a subframe different from the subframe having IMR in the current cell to make the IMR more accurately reflect interferences. Thus, the IMR of a cell is able to reflect actual conditions of interferences because the duplexing directions of the resources occupied by IMR in other cells are all flexible.

Figure 4:
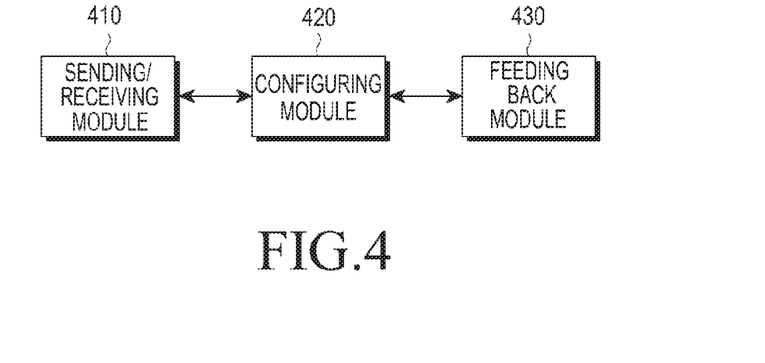
FIG. 4 is a schematic diagram illustrating a structure of an apparatus in accordance with an embodiment of the present invention.

An embodiment of the present invention provides an apparatus corresponding to the above-described methods. As shown in FIG. 4, the apparatus includes a sending/receiving module 410, a configuring module 420 and a feeding back module 430.

The sending/receiving module 410 is configured to receive configuration information of downlink transmission in a flexible subframe, sending the configuration information to the configuring module; detecting downlink control information sent by a base station in the flexible subframe, and receiving downlink data corresponding to the downlink control information.

Figure 9:
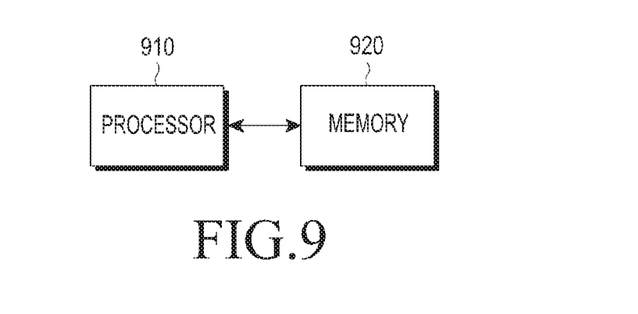
FIG. 9 is a schematic diagram illustrating a structure of a UE according to an embodiment of the present invention.

FIG. 9 is a schematic diagram illustrating a structure of a UE according to an embodiment of the present invention.

As shown in FIG. 9, in a UE hardware device according to an embodiment of the present invention, includes a processor 910, a memory 920, and a transceiver (not shown). The processor 910 runs functions to support module 410, and the memory 920 stores the machine codes of the UE hardware implementation and buffers the downlink and uplink control/data to be received and transmitted.

The configuring module 420 is configured to performing configurations for a flexible subframe that are different from configurations for a subframe whose duplexing direction is fixed. With respect to each function at UE, module 430 performs according to step 201A, 201B, 201C, or 201D in FIG. 5, 6, 7, or 8 respectively.

The feeding back module 430 is configured to report HARQ-ACK for the downlink data and CSI to the base station. The feeding back module 430 performs according to the step 202 in FIG. 2.

The modules shown in FIG. 4 implement respective functions according to the above-described methods, which will not be described in further detail herein for clarity and conciseness.

By adopting a method and apparatus according to embodiments of the present invention, when a flexible subframe is used for downlink transmission, a UL/DL transmission method different from that of a subframe dedicated for downlink transmission is configured for the flexible subframe, thus reliability and flexibility of EPDCCH transmission in the flexible subframe are improved, and accuracy of CSI feedback information for the flexible subframe is also increased.

While the present invention has been illustrated and described with reference to certain embodiments thereof, various modifications or changes can be made without departing from the scope of the present invention. Therefore, the scope of the present invention is not limited to the described embodiments, but is defined by the scope of the following claims and any equivalents thereof.

What is claimed is:

1. A method for reporting channel state information (CSI) by a user equipment (UE), the method comprising:
   receiving, from a base station (BS), first configuration information configuring a first subframe set and a second subframe set;
   receiving, from the BS, second configuration information configuring a first interference measurement resource (IMR) for the first subframe set and a second IMR for the second subframe set, the second configuration information including a subframe configuration and a resource configuration; and
   receiving, from the BS, third configuration information on a zero-power (ZP) CSI-reference signal (CSI-RS) configuring a first ZP CSI-RS resource and a second ZP CSI-RS resource,
   wherein the subframe configuration includes first subframe configuration and second subframe configuration, and the resource configuration includes first resource configuration and second resource configuration,
   wherein the first IMR is configured based on a first subframe offset and resource elements (REs), the first subframe offset being indicated by the first subframe configuration, the REs of the first IMR being configured based on the first resource configuration,
   wherein the second IMR is configured based on a second subframe offset and REs, the second subframe offset being indicated by the second subframe configuration, the REs of the second IMR being configured based on the second resource configuration,
   wherein the third configuration information is used to determine a physical downlink shared channel (PDSCH) RE mapping, and wherein the first ZP CSI-RS resource includes the first IMR and the second ZP CSI-RS resource includes the second IMR.

2. A user equipment (UE) for reporting channel state information (CSI), the UE comprising:
a transceiver; and
at least one processor coupled with the transceiver, wherein the at least one processor is configured to control to:
receive, from a base station (BS), first configuration information configuring a first subframe set and a second subframe set,
receive, from the BS, second configuration information configuring a first interference measurement resource (IMR) for the first subframe set and a second IMR for the second subframe set, the second configuration information including a subframe configuration and a resource configuration, and
receive, from the BS, third configuration information on a zero-power (ZP) CSI-reference signal (CSI-RS) configuring a first ZP CSI-RS resource and a second ZP CSI-RS resource,
wherein the subframe configuration includes first subframe configuration and second subframe configuration, and the resource configuration includes first resource configuration and second resource configuration,
wherein the first IMR is configured based on a first subframe offset and resource elements (REs), the first subframe offset being indicated by the first subframe configuration, the REs of the first IMR being configured based on the first resource configuration,
wherein the second IMR is configured based on a second subframe offset and REs, the second subframe offset being indicated by the second subframe configuration, the REs of the second IMR being configured based on the second resource configuration,
wherein the third configuration information is used to determine a physical downlink shared channel (PDSCH) RE mapping, and
wherein the first ZP CSI-RS resource includes the first IMR and the second ZP CSI-RS resource includes the second IMR.

3. A method for receiving, by a base station (BS), channel state information (CSI), the method comprising:
transmitting, to a user equipment (UE), first configuration information configuring a first subframe set and a second subframe set;
transmitting, to the UE, second configuration information configuring a first interference measurement resource (IMR) for the first subframe set and a second IMR for the second subframe set, the second configuration information including a subframe configuration and a resource configuration, and
transmitting, to the UE, third configuration information on a zero-power (ZP) CSI-reference signal (CSI-RS) configuring a first ZP CSI-RS resource and a second ZP CSI-RS resource,
wherein the subframe configuration includes first subframe configuration and second subframe configuration, and the resource configuration includes first resource configuration and second resource configuration,
wherein a first IMR is configured based on a first subframe offset and resource elements (REs), the first subframe offset being indicated by the first subframe configuration, the REs of the first IMR being configured based on the first resource configuration,
wherein a second IMR is configured based on a second subframe offset and REs, the second subframe offset being indicated by the second subframe configuration, the REs of the second IMR being configured based on the second resource configuration,
wherein the third configuration information is used to determine a physical downlink shared channel (PDSCH) RE mapping, and
wherein the first ZP CSI-RS resource includes the first IMR and the second ZP CSI-RS resource includes the second IMR.

4. A base station (BS) for receiving a report of channel state information (CSI), the BS comprising:
a transceiver; and
at least one processor coupled with the transceiver, wherein the at least one processor is configured to control to:
transmit, to a user equipment (UE), first configuration information configuring a first subframe set and a second subframe set,
transmit, to the UE, second configuration information configuring a first interference measurement resource (IMR) for the first subframe set and a second IMR for the second subframe set, the second configuration information including subframe configuration and resource configuration, and
transmit, to the UE, third configuration information on a zero-power (ZP) CSI-reference signal (CSI-RS) configuring a first ZP CSI-RS resource and a second ZP CSI-RS resource,
wherein the subframe configuration includes first subframe configuration and second subframe configuration, and the resource configuration includes first resource configuration and second resource configuration,
wherein a first IMR is configured based on a first subframe offset and resource elements (REs), the first subframe offset being indicated by the first subframe configuration, the REs of the first IMR being configured based on the first resource configuration,
wherein a second IMR is configured based on a second subframe offset and REs, the second subframe offset being indicated by the second subframe configuration, the REs of the second IMR being configured based on the second resource configuration,
wherein the third configuration information is used to determine a physical downlink shared channel (PDSCH) RE mapping, and
wherein the first ZP CSI-RS resource includes the first IMR and the second ZP CSI-RS resource includes the second IMR.

* * * * *